United States Patent [19]

Sterling et al.

[11] 4,214,293

[45] Jul. 22, 1980

[54] ELECTROLYTIC CAPACITORS

[75] Inventors: Henley F. Sterling, Great Dunmow; Eric L. Bush, Matching Green, Near Harlow; Stephen J. McManus, Harlow, all of England

[73] Assignee: International Standard Electric Corporation, New York, N.Y.

[21] Appl. No.: 14,008

[22] Filed: Feb. 21, 1979

Related U.S. Application Data

[63] Continuation of Ser. No. 787,672, Apr. 14, 1977, abandoned.

[30] Foreign Application Priority Data

May 20, 1976 [GB] United Kingdom ............... 20879/76

[51] Int. Cl.² ............................................. H01G 9/00
[52] U.S. Cl. ...................................... 361/433; 29/570
[58] Field of Search ........................... 361/433; 29/570

[56] References Cited

U.S. PATENT DOCUMENTS

| | | | |
|---|---|---|---|
| 2,406,345 | 8/1946 | Brennan | 361/433 |
| 3,248,612 | 4/1966 | Rogers | 361/433 |
| 3,708,728 | 1/1973 | Sterling et al. | 361/433 |
| 3,984,208 | 10/1976 | Moulin et al. | 361/433 |
| 4,041,359 | 8/1977 | Mizushima et al. | 361/433 |
| 4,079,441 | 3/1978 | Bush et al. | 361/433 |

Primary Examiner—James W. Davie
Attorney, Agent, or Firm—John T. O'Halloran; Peter C. Van Der Sluys

[57] ABSTRACT

A solid electrolytic capacitor has a porous anode body manufactured from a valve metal coated core by pressure compaction of the metal powder at 25 to 40 tons per square inch. No subsequent sintering is required by this process.

27 Claims, 8 Drawing Figures

ELECTROLYTIC CAPACITORS

This is a continuation, of application Ser. No. 787,672, filed Apr. 14, 1977, now abandoned.

FIELD OF THE INVENTION

This invention relates to electrolytic capacitors.

BACKGROUND OF THE INVENTION

Electrolytic capacitors may have anodes manufactured from a valve metal powder by suitable compaction thereof to form a coherent porous body which is subsequently processed to produce the dielectric of the capacitor, by anodising the valve metal, and to introduce into or cause formation within the anodised, porous body an appropriate electrolyte liquid or solid respectively.

Since a considerable proportion of the valve metal does not play an active part in the capacity forming mechanism, there has been used a valve metal coated powder to form the porous anode, again using suitable compaction techniques. This approach, which reduces the amount of valve metal required, is particularly attractive from a cost-saving point of view when the valve metal employed is relatively expensive, e.g. tantalum, niobium, or tantalum/niobium alloys.

The core material of the valve metal coated powder may be electrically conducting, as described for example in British Specification No. 1,298,928, but there are some disadvantages in employing certain categories of electrically conducting core material, particularly if it is of a metal or alloy which is not a valve metal, in that compaction of the coated powder may cause the core material to be exposed through the valve metal coating.

Alternatively, the core material may be electrically insulating, typically a ceramic. So far as is known, all anode compaction processes for producing capacitor anodes from valve metal coated ceramic powder have involved a two-stage process in which the powder is first pressed and then sintered, the sintering temperature being at least 1600° C. for tantalum coated alumina powder.

It is an object of the present invention to eliminate the sintering stage, whereby production costs are reduced.

SUMMARY OF THE INVENTION

According to the invention there is provided an electrolytic capacitor having an anode comprising a pressure compacted, non-sintered, porous body of valve metal coated particles whose core material is electrically insulating and is significantly harder than the valve metal coating.

According to the invention there is also provided a method of manufacturing an electrolytic capacitor which includes the steps of pressure compacting valve metal coated particles whose core material is electrically insulating and is significantly harder then the valve metal coating to form a coherent porous anode body, and, without sintering the body, anodising the valve metal to form the dielectric of the capacitor.

DESCRIPTION OF THE PREFERRED EMBODIMENT

The ability to produce satisfactory anodes from valve metal coated insulating particles compacted solely by pressure is dependent on a number of factors.

1. The compaction pressure.
2. The expansion coefficient of the core material.
3. The size of the particles of core material.
4. The chemical and physical characteristics of the core material.
5. The thickness of the valve metal coating.

The compaction pressure is in the range 25 to 40 tons per square inch whatever the valve metal coating used.

Figure 1:
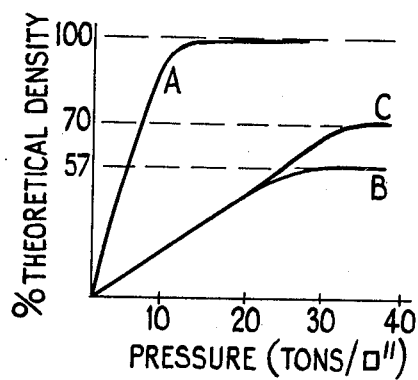
FIG. 1 is a graphic representation of % theoretical density of tantalum powder and tantalum coated alumina powder vs. compaction pressure.

In FIG. 1, curve A is for all-tantalum powder, which can be compacted to virtually 100% theoretical density (d=16.6), i.e. substantially no porosity, at a pressure below 20 tons per square inch. Accordingly, to achieve a lesser % theoretical density, i.e. to have porosity, the compaction pressure would not exceed at most 10 tons per square inch.

With valve metal coated insulating particles substantially harder than the coating, there is a form of automatic density determining mechanism on compaction, in that the applied pressure squeezes the coated particles together until the cores contact one another. Clearly the valve metal coating thickness determines the final % theoretical density, because for a given core size, a relatively thick coating gives a higher density than a relatively thin coating.

The thickness of the valve metal coating is preferably less than 1 $\mu$m so that, upon anodisation of the anode at a voltage determined by the required voltage code of the capacitor the average thickness of the unanodised valve metal coating does not exceed 0.5 $\mu$m. This is fully described in co-pending U.S. Pat. application Ser. No. 700,429, filed June 28, 1976, now U.S. Pat. No. 4,079,441 and assigned to the assignee of the instant invention.

The core size is typically in the range of 9–13 $\mu$m, and curve B of FIG. 1 shows the % theoretical density (around 57%) for tantalum coated powder with alumina cores in this range with a tantalum coating of about 0.3 $\mu$m. The same curve B would be obtained with the same thickness of tantalum coating on cores with a size in the range of 13–17 $\mu$m, or 17–21 $\mu$m.

Higher density may be obtained by extending the range of core size, and curve C is for a range of 9–17 $\mu$m, achieving around 70% theoretical density. This higher number is caused by the fact that the smaller cores within the range pack into the interstices between the larger cores.

The expansion coefficient of the core material should be comparable with that of the valve metal coating.

The physical and chemical characteristics of the core materials such as hardness and electrically insulating have already been mentioned. The core material should not degrade either on its own or by reaction with the deposited valve metal coating. The core material may be crystalline or amorphous.

For tantalum, alumina is the preferred core material. Other ceramic core materials include silicon carbide and titania. The core material may alternatively comprise silica or a suitable glass.

Ready availability in a particle size graded form is clearly another factor.

The valve metal coating may consist exclusively of the particular valve metal, or alloy of valve metals, or additionally may contain a small amount (typically up to 1% by weight) or doping elements such as Mo which has been found to improve the electrical characteristics of the finished capacitor.

Compaction of the valve metal coated powder can be accomplished by using conventional hard dies and punches with a binder incorporated into the powder and subsequently removed prior to subsequent capacitor forming stages. Isostatic compaction using a polyurethane sack for the material containment and to act as a "tooling" can be used also. A binder does not have to be used with isostatic compaction and the powder can be dry pressed.

FIGS. 2 to 8, show the successive stages in the manufacture of a tantalum coated powder capacitor.

There are five stages of production.
1. Tantalum coating the core material.
2. Production of anodes from tantalum coated powder.
3. Anodising coated powder anodes.
4. Manganising coated powder anodes.
5. Finishing the capacitor unit.

Figure 2:
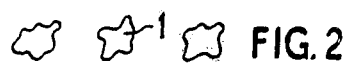
FIG. 2 is a sectional view of the core material for the coated anode of this invention.
Figure 3:
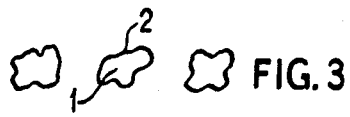
FIG. 3 is a sectional view of the core material of FIG. 1 including a metal coating.

1. (FIGS. 2 and 3). The tantalum coating 2 on crystalline alumina core material 1, coating thickness typically 0.3 $\mu$m on cores in the range 9–13 $\mu$m, is produced by reducing tantalum pentachloride, with an atmosphere of hydrogen, in the presence of alumina powder at a temperature of about 1000° C. Practically this is achieved in a fluid bed type reactor where the alumina powder is held in suspension by a gas stream containing a mixture of argon and hydrogen. Tantalum pentachloride held in a separate container is vaporised and carried in either argon or hydrogen into the fluid bed reactor.

During the reaction tantalum metal is deposited on the surface of the alumina and hydrogen chloride is liberated. The liberated gas is processed to prevent atmospheric pollution.

Figure 4:
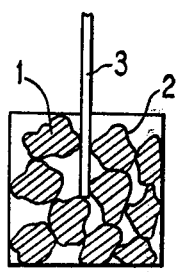
FIG. 4 is a sectional view of a compacted mass of the coated core material of FIG. 3.

2. (FIG. 4). The tantalum coated alumina is mixed with 10 to 15% by weight of camphor and by dissolving the camphor in a suitable solvent such as ethyl ether and adding to the powder. The solvent is later evaporated in an atmosphere of dry inert gas such as argon or nitrogen.

Inert gas is used to prevent atmospheric moisture from condensing on the powder due to the reduction in temperature during evaporation. Moisture in the powder mix is undesirable since it tends to make the powder sticky and difficult to handle.

After sieving, the camphored powder is pressed into a compact of a pre-determined weight and diameter, e.g. 0.046 grams and $\frac{1}{8}$ inch respectively for a 10 $\mu$F.15 V working capacitor, by one of the two methods previously mentioned. During compaction a tantalum lead wire 3 is introduced into the compact. For the above described capacitor, the compaction pressure is 25 tons per square inch. This ensures a strong compact which does not need sintering.

Following compaction the anodes are welded by the tantalum lead wires to frames for processing and then (if they have been camphored) the camphor is removed by placing the anodes in an oven with a temperature set at 145°±5° C. for a minimum of 1 hour. The length of time required for heating varies with the size of the anode.

To remove any residues of camphor and to prepare the anodes for anodising, the anodes are boiled in demineralised water to which has been added a small quantity of a wetting agent, for example, Tee-pol (Shell)

Figure 5:
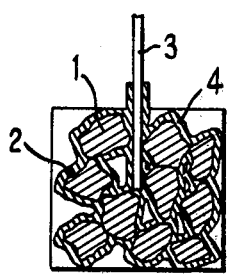
FIG. 5 is a sectional view of the structure of FIG. 4 after anodization.

3. (FIG. 5). To form the tantalum pentoxide dielectric layer 4, the boiled anodes are suspended in a bath of 0.1% phosphoric acid solution at a temperature of 50° C. The bath is made of stainless steel and is connected as cathode to a power supply which can act in both constant current and constant voltage modes. The anodes are connected via their frame to the positive output of the power supply.

A constant current of 60 mA per gram of tantalum coated powder is applied until a predetermined voltage has been reached (60 V for 10 $\mu$F.15 V capacitors). This voltage is then held for 3 hours on the constant voltage mode.

On completion of the anodising process, the anodes are removed from the bath and boiled in demineralised water until the phosphoric acid has been removed. The water is then removed by oven drying at 200° C. for 30 minutes.

4. (FIG. 6) The manganising process to form the manganese dioxide 5 is divided into three stages.
   a. Primary dips. These are to fill the porous interior of the anodes and a fairly dilute solution of manganese nitrate of speicifc gravity 1.45 is used. Typical small anodes might need 5 cycles of primary manganising and large anodes may require 8 10 cycles. The anodes are dipped in the solution for 15 minutes and then transferred to a drying oven at 85° C. for 1 hour. After drying, the anodes are placed in a decomposition oven at 200° C. for 1 hour.
   b. Secondary dips. These are similar to primary dips except that a more concentrated manganese nitrate solution of specific gravity 1.74 is used. The secondary dips build up an outer coating of manganese dioxide on the anode. The coating is soft in nature, but thick. Typically 2 to 4 of these dips are used depending on anode size.
   c. Rapid dips. Used to build up a hard impervious layer on the outside of the secondary dips. The same dip time and specific gravity as the secondary dips are employed. No drying cycle is required and decomposition occurs within 15 minutes. During decomposition water is injected into the oven to provide a humid atmosphere. Between 3 and 5 of these rapid dips are used depending on anode size.

After every two dips throughout the whole manganising process, a reform cycle is interposed. This is similar to anodising, but using phosphoric acid of 0.01% concentration. A power supply generates a voltage ramp rising to a preset voltage (30 V for 10 $\mu$F.15 V capacitors) over 40 minutes. This voltage is held for 5 minutes. The manganised anodes are boiled in demineralised water after each reform cycle.

Figure 6:
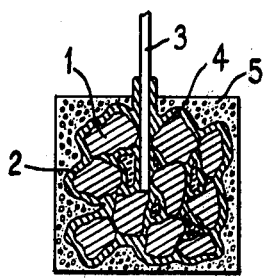
FIG. 6 is a sectional view of the structure of FIG. 5 after adding the electrolyte.
Figure 7:
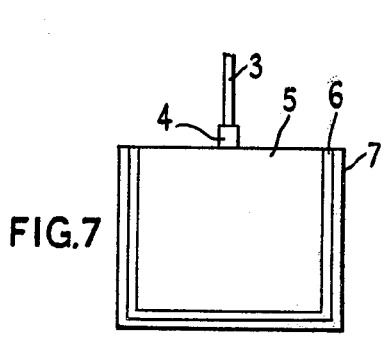
FIG. 7 is a side view of the structure of FIG. 6 in partial section after adding a graphite coating and a layer of conductive resin.
Figure 8:
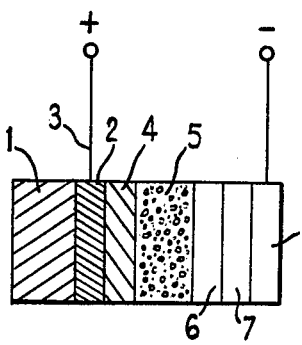
FIG. 8 is a sectional view of the electrolytic capacitor attending to the invention in complete form.

5. (FIGS. 6, 7 and 8). After manganising, the capacitors consist of a tantalum layer 12 on the alumina 1, acting as anode, tantalum pentoxide 4 as a dielectric, and manganese dioxide 5 as the cathode. The final stages or processing consist of making good electrical contact to the manganese dioxide, and encapsulation.

Two coatings are added to the outside of the manganese dioxide, firstly graphite 6 to give a low resistance cover, and then silver loaded resin 7 to give a base for soldering the unit into a can 8 for encapsulation.

An extension lead wire of solder coated nickel is welded to the tantalum anode wire 3 after removal of the anode from the process frame. The anode is soldered into its can and the can sealed by a glass/metal seal.

It is to be understood that the foregoing description of specific examples of this invention is made by way of example only and is not to be considered as a limitation on its scope.

We claim:

1. An anode for an electrolytic capacitor comprising:
   a core material consisting essentially of particles of an electrically insulating substance having a first degree of hardness; and
   a coating of valve metal, having a second degree of less than said first degree of hardness, on the core material wherein the coated core material is pressure compacted into a porous coherent anode body without sintering and the degree of porosity is partially controlled by the thickness of the valve metal coating.

2. The anode of claim 1 wherein the metal coating has an anodized outer surface.

3. The anode of claim 1 wherein the core material comprises a ceramic.

4. The anode of claim 1 wherein the core material comprises silica.

5. the anode of claim 1 wherein the core material comprises a glass.

6. The anode of claim 3 wherein the ceramic comprises alumina.

7. The anode of claim 1 wherein the valve metal is selected from the group consisting of tantalum, niobium and tantalum/niobium alloy.

8. The anode of claim 1 wherein the metal coating includes a small proportion of a doping element to improve the electrical properties of the capacitor.

9. The anode of claim 8 wherein the doping element comprises molybdenum.

10. A method of manufacturing an electrolytic capacitor body without sintering the anode material, including the steps of:
    pressure compacting valve metal coated particles having a core material that is electrically insulating and is significantly harder than the valve metal coating to form a coherent porous anode, the porosity of which is partially controlled by the thickness of said coating; and
    anodizing the valve metal coating to form the dielectric of the capacitor.

11. The method of claim 10 wherein a ceramic is selected for the core material.

12. The method of claim 11 wherein alumina is selected for the ceramic.

13. The method of claim 10 wherein silica is selected for the core material.

14. The method of claim 10 wherein glass is selected for the core material.

15. The method of claim 10 wherein the valve metal is selected from the group consisting of tantalum, niobium and tantalum/niobium alloy.

16. The method of claim 10 including the step of adding a dopant to the valve metal coating to improve the electrical properties of the capacitor.

17. The method of claim 10 wherein the metal coated particles are compacted at a pressure of between 25 to 40 tons per square inch.

18. The method of claim 10 wherein step of pressure compacting comprises isostatic pressure.

19. A method of manufacturing an electrolytic capacitor containing an unsintered anode body comprising the steps of:
    selecting an electrically insulating core material in the range of 8-13 microns particle size;
    coating the core material to a thickness of not greater than 1 micron of a valve metal;
    compacting the metal coated core material at a pressure of between 25 to 40 tons per square inch to form a coherent porous anode body;
    anodizing the anode body to form a dielectric layer on the surface of said body; and
    applying an outer layer of manganese dioxide on the dielectric surface to provide a cathode for the capacitor.

20. An anode for an electrolytic capacitor, comprising:
    a core material consisting essentially of particles of an electrically insulating substance, said particles having a size of between 9 and 21 microns; and
    a coating of valve metal on the core material wherein the coated core material is compacted into a porous coherent anode body without sintering.

21. An anode for an electrolytic capacitor, comprising:
    a core material consisting essentially of particles of an electrically insulating substance; and
    a coating of valve metal on the core material, said coated core material being compacted at a pressure of between 25 to 40 tons per square inch into a porous coherent anode body without sintering.

22. A method of manufacturing an electrolytic capacitor body without sintering the anode material, including the steps of:
    pressure compacting valve metal coated particles having a core material that is electrically insulating and is significantly harder than the valve metal coating to form a coherent porous anode, said coating having a thickness of less than 1 micron; and
    anodizing the valve metal coating to form the dielectric of the capacitor.

23. A method of manufacturing an electrolytic capacitor body without sintering the anode material, including the steps of:
    pressure compacting valve metal coated particles of an electrically insulating core material having a size between 9 and 21 microns and being significantly harder than the valve metal coating to form a coherent porous anode; and
    anodizing the valve metal coating to form the dielectric of the capacitor.

24. An anode for an electrolytic capacitor, comprising:
    a particulate core material of a relatively hard electrically insulating substance; and
    a coating of a valve metal on the core material particles, said valve metal being less hard than the core material and the thickness of the valve metal coating being such that the coated core material is capable of being compacted under pressure alone to form a porous coherent anode body.

25. An anode for an electrolytic capacitor, comprising:
a particulate core material of an electrically insulating substance having a first degree of hardness; and
a coating of valve metal, having a second degree of hardness less than said first degree of hardness, on the core material, the coated core material being compacted under pressure so that the valve metal coating is partially displaced and the core material of adjacent particles contact one another to form a porous coherent anode body without sintering.

26. A method of manufacturing an electrolytic capacitor body without sintering the anode material, including the steps of:

selecting a particulate core material of an electrically insulating substance having a first degree of hardness;
coating the core material particles with a valve metal having a second degree of hardness less than said first degree of hardness; and
compacting the coated core material at a pressure sufficient to cause the coating to be partially displaced and to allow the core material of adjacent particles to contact one another, whereby a porous coherent anode body is formed without sintering.

27. A method as described in claim 26, wherein the degree of porosity of the anode body is controlled by controlling the thickness of the coating on the core material.

* * * * *